Nov. 10, 1931.  E. E. SLICK  1,831,548
APPARATUS FOR PRESSING GLASS ARTICLES
Filed Oct. 5, 1928  2 Sheets-Sheet 2

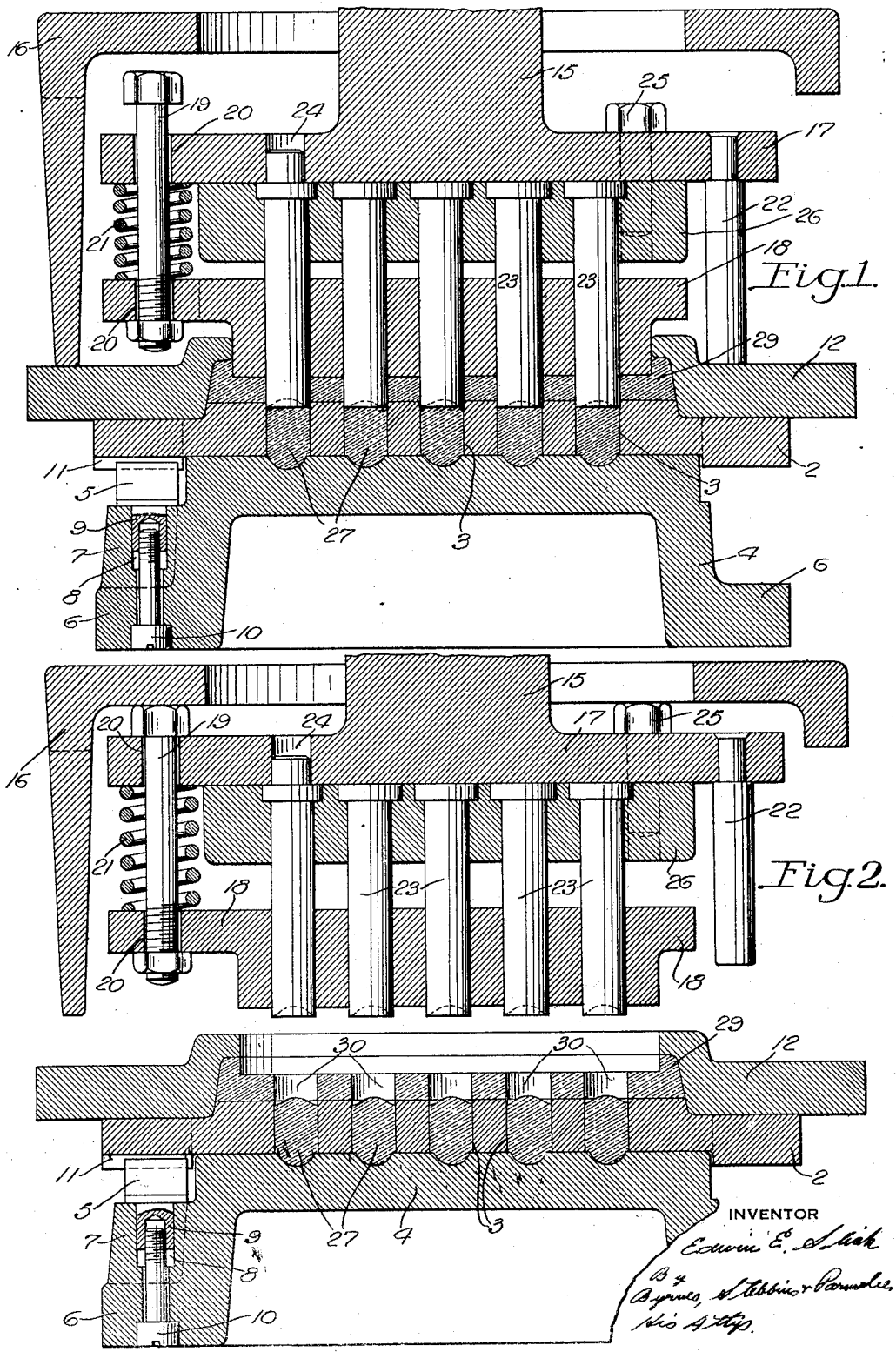

INVENTOR
Edwin E. Slick
By Byrnes, Stebbins & Parmelee
His Attys.

Patented Nov. 10, 1931

1,831,548

UNITED STATES PATENT OFFICE

EDWIN E. SLICK, OF PITTSBURGH, PENNSYLVANIA

APPARATUS FOR PRESSING GLASS ARTICLES

Application filed October 5, 1928. Serial No. 310,535.

This invention relates to apparatus for pressing glass articles.

In the drawings, which show the present preferred embodiment of an apparatus which may be used in carrying out the process,—

Figure 1 is a vertical section through the mold and press showing the position of the press with respect to the mold at the moment the articles have been completely stamped out from the blank;

Figure 2 is a similar view showing the position of the press after it has been raised from the mold;

Figure 5:
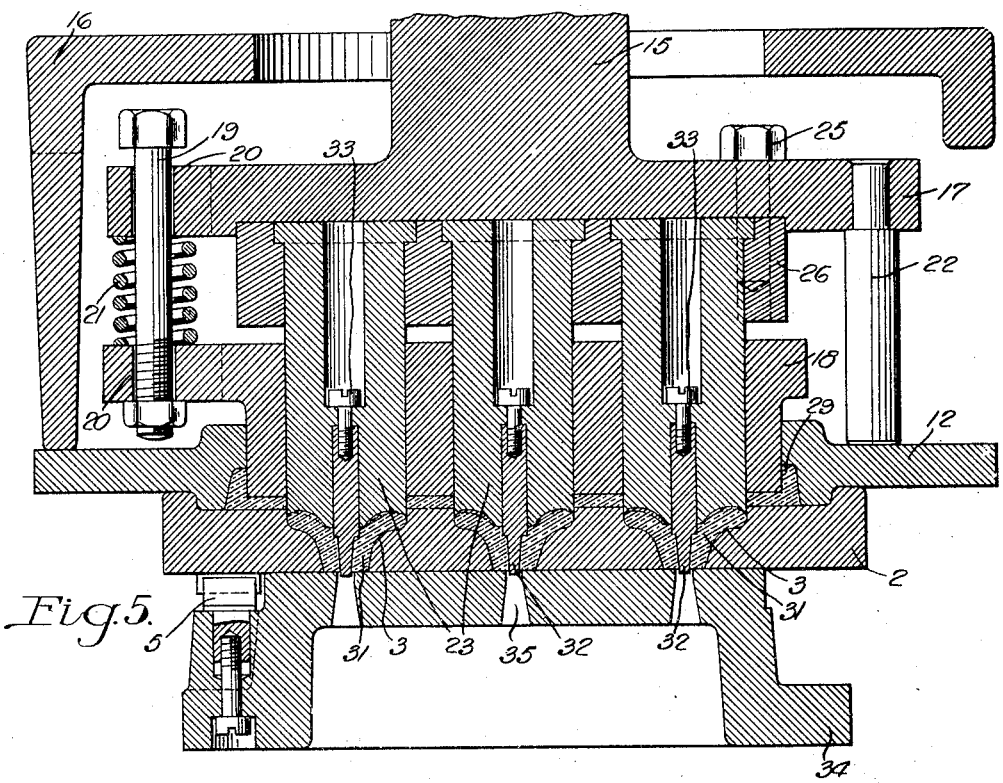
Figure 5 is a view similar to Figures 1 and 2 but showing a modified apparatus adapted for stamping out furniture knobs.

Referring to Figures 1 to 4, a mold 2 is provided with a plurality of recesses 3 corresponding in shape to the shape of the desired article. The mold is mounted on a base 4 and is maintained in the desired position by means of locating pads 5. The flange 6 of the base has a series of lugs 7 spaced thereon, each of the lugs being provided with an opening 8 which receives the shank 9 of the locating pad 5. The locating pads may be raised or lowered by turning the screw 10, the upper end of which is screw-threaded to the shank of the pad. The pads cooperate with recesses 11 provided on the under side of the mold so that when the locating pads are raised into cooperative relationship with the recesses the mold is prevented from turning on its base.

A shell 12 is mounted on the mold and is adapted to form a receptacle for the charge of molten glass. A press 15 is movable within a cover 16. The press comprises an upper member 17 and a lower member 18. The upper and lower members are resiliently connected to each other by bolts 19 extending through recesses 20 in the upper and lower members. The bolt is of a smaller diameter than the openings so that the upper and lower members are free to move relatively to each other, being guided by the bolts. Springs 21 are arranged between the upper and lower members and surround the bolts 19. In their normal positions the springs maintain the upper and lower members spaced apart. Pins 22 are mounted in the upper member and limit the distance through which the press may be moved.

Plungers 23 are rigidly connected to the upper member 17 by inserting the upper ends of the plungers into openings 24 and securing the plungers in place by tightening the screws 25 which secure the plate 26 to the upper member.

In carrying out the process, a charge of glass is placed on the mold 2 within the shell 12 and the press is lowered by any desired means. During the lowering of the press the upper and lower members remain spaced apart, due to the tension of the springs 21, until the lower member 18 has pressed the charge of glass into a blank. Upon further movement of the press toward the mold the lower member 18 remains substantially in the same position, thereby compressing the springs 21. The springs 21 provide against excess pressure on the unstamped portion of the blank tending to break the mold. The plungers 23 continue to move downwardly and stamp out portions 27 of the blank, thereby producing the rough lenses. After raising the press and plungers to the position shown in Figure 2, the mold may be disassembled and the articles removed therefrom.

Figure 3:
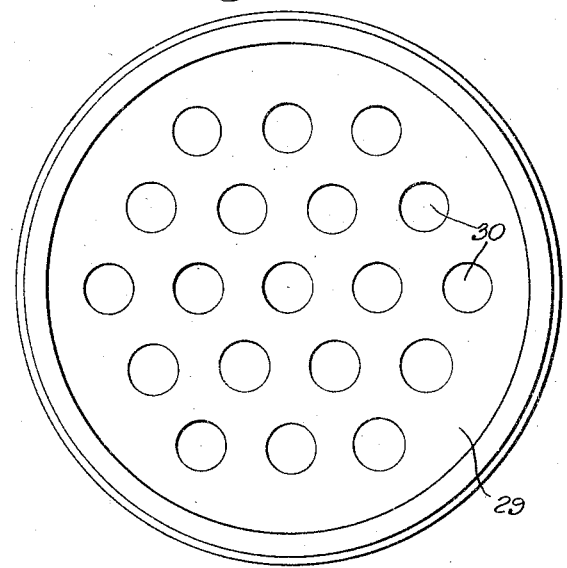
Figure 3 is a plan view of the blank showing the openings resulting from stamping out a plurality of articles such as shown in Figure 4.
Figure 4:
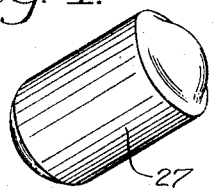
Figure 4 is a perspective of a lens which has been stamped out from the blank shown in Figure 3.

After the pressing operation has been completed, there results from the process a blank 29, as shown in Figure 3, having a plurality of openings 30 formed therein, which openings result from stamping out the lenses shown in Figure 4. After the lenses have been stamped out they may be ground, if necessary, to produce the finished article.

In the modification shown in Figure 5, the mold is of a shape suitable for forming glass furniture knobs 31. The mold is substantially similar to that described in connection with Figures 1 to 4, but an auxiliary plunger 32 is mounted within each of the main plungers by means of screws 33. The base 34 for the mold differs slightly in that openings 35 are provided for the reception of the auxiliary plungers 32. When an article is formed in the mold shown in Figure 5, the charge of glass is first formed into a blank as previously described, and the furniture knobs 31 are then stamped out. During the formation and stamping out of the knobs the auxiliary plunger 32 is forced through the plastic material to form an opening in the knobs. The resulting article, therefore, is provided with an opening made by the auxiliary plunger 32, which opening may be used for fastening the furniture knob to the furniture.

I have illustrated and described the present preferred embodiment of my apparatus and the present preferred method of carrying out my process. It should be understood, however, that the invention may be otherwise modified without departing from the scope of the following claim.

I claim:

An apparatus for forming glass articles and the like, which comprises a mold having a bottom plate provided with an opening therethrough, a press including an upper and a lower member resiliently connected to each other, a plunger rigidly connected to said upper member and slidable through an opening in said lower member, said lower member being adapted to form a blank, said plunger being adapted to stamp out an article from the blank, and an auxiliary plunger mounted in and projecting below said first mentioned plunger in order to form an opening in the article.

In testimony whereof I have hereunto set my hand.

EDWIN E. SLICK.